(12) United States Patent
Kim

(10) Patent No.: US 11,941,272 B2
(45) Date of Patent: Mar. 26, 2024

(54) MEMORY SYSTEM AND OPERATING METHOD OF MEMORY SYSTEM

(71) Applicant: SK hynix Inc., Gyeonggi-do (KR)

(72) Inventor: Jung Woo Kim, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 107 days.

(21) Appl. No.: 17/674,483

(22) Filed: Feb. 17, 2022

(65) Prior Publication Data
US 2023/0114493 A1    Apr. 13, 2023

(30) Foreign Application Priority Data
Oct. 8, 2021   (KR) .................. 10-2021-0133886

(51) Int. Cl.
*G06F 3/06*   (2006.01)

(52) U.S. Cl.
CPC ............ *G06F 3/064* (2013.01); *G06F 3/0604* (2013.01); *G06F 3/0659* (2013.01); *G06F 3/0679* (2013.01)

(58) Field of Classification Search
CPC ...... G06F 3/064; G06F 3/0604; G06F 3/0659; G06F 3/0679; G06F 3/0616; G06F 3/061; G06F 3/0614; G06F 3/0653; G06F 3/0658
See application file for complete search history.

(56) References Cited

U.S. PATENT DOCUMENTS

| | | | |
|---|---|---|---|
| 9,830,079 B2 | 11/2017 | Kanno | |
| 10,162,748 B2* | 12/2018 | Kotte | G06F 3/0679 |
| 2003/0135709 A1* | 7/2003 | Niles | G06F 3/0665 |
| | | | 711/219 |
| 2018/0024737 A1* | 1/2018 | Dubeyko | G06F 3/064 |
| | | | 711/102 |
| 2018/0232173 A1* | 8/2018 | Chung | G06F 3/0653 |
| 2019/0179763 A1* | 6/2019 | Lo | G06F 12/06 |
| 2021/0286718 A1* | 9/2021 | Ravindar | G06F 8/443 |
| 2021/0294695 A1* | 9/2021 | Li | G06F 11/3037 |
| 2022/0026977 A1* | 1/2022 | Sanders | G06F 3/0659 |

FOREIGN PATENT DOCUMENTS

KR   10-2013-0076429 A   7/2013

* cited by examiner

*Primary Examiner* — Francisco A Grullon
(74) *Attorney, Agent, or Firm* — IP & T GROUP LLP

(57) ABSTRACT

Embodiments of the present disclosure relate to a memory system and an operating method of the memory system. According to embodiments of the present disclosure, the memory system may, with respect to data stored in the memory device, write the data to a first target memory block or a second target memory block among the plurality of memory blocks according to whether a data type of the data is a read-intensive type or a write-intensive type.

14 Claims, 17 Drawing Sheets

FIG.5

TBL_1 (Before)

| LBA | R_CNT | W_CNT |
|-----|-------|-------|
| 0 | 51 | 4 |
| 1 | 51 | 4 |
| 2 | 3 | 27 |
| 3 | 45 | 10 |
| 4 | 4 | 45 |
| 5 | 4 | 45 |
| ⋮ | | |

HOST: R_CMD[0, 1]
HOST: W_CMD[3]

TBL_2 (After)

| LBA | R_CNT | W_CNT |
|-----|-------|-------|
| 0 | 52 | 4 |
| 1 | 52 | 4 |
| 2 | 3 | 27 |
| 3 | 45 | 11 |
| 4 | 4 | 45 |
| 5 | 4 | 45 |
| ⋮ | | |

FIG.6

1st_Threshold : 53

| LBA | R_CNT | W_CNT |
|---|---|---|
| 0 | 52 | 4 |
| 1 | 52 | 4 |
| 2 | 3 | 27 |
| 3 | 45 | 11 |
| 4 | 4 | 45 |
| 5 | 4 | 45 |
| ⋮ | | |

HOST: R_CMD[0, 1] →   R_Intensive

| LBA | R_CNT | W_CNT |
|---|---|---|
| 0 | 53 | 4 |
| 1 | 53 | 4 |
| 2 | 3 | 27 |
| 3 | 45 | 11 |
| 4 | 4 | 45 |
| 5 | 4 | 45 |
| ⋮ | | |

2nd_Threshold : 12

| LBA | R_CNT | W_CNT |
|---|---|---|
| 0 | 52 | 4 |
| 1 | 52 | 4 |
| 2 | 3 | 27 |
| 3 | 45 | 11 |
| 4 | 4 | 45 |
| 5 | 4 | 45 |
| ⋮ | | |

HOST: W_CMD[3] →   W_Intensive

| LBA | R_CNT | W_CNT |
|---|---|---|
| 0 | 52 | 4 |
| 1 | 52 | 4 |
| 2 | 3 | 27 |
| 3 | 45 | 12 |
| 4 | 4 | 45 |
| 5 | 4 | 45 |
| ⋮ | | |

FIG.7

| LBA | Type |
|---|---|
| 0 | W_Intensive |
| 1 | W_Intensive |
| 2 |  |
| 3 |  |
| 4 | W_Intensive |
| 5 | W_Intensive |
| ⋮ |  |

| LBA | Type |
|---|---|
| 0 | R_Intensive |
| 1 | R_Intensive |
| 2 |  |
| 3 |  |
| 4 | W_Intensive |
| 5 | W_Intensive |
| ⋮ |  |

| LBA | Type |
|---|---|
| 0 |  |
| 1 |  |
| 2 |  |
| 3 | R_Intensive |
| 4 | W_Intensive |
| 5 | W_Intensive |
| ⋮ |  |

| LBA | Type |
|---|---|
| 0 |  |
| 1 |  |
| 2 |  |
| 3 | W_Intensive |
| 4 | W_Intensive |
| 5 | W_Intensive |
| ⋮ |  |

FIG.9

| LBA | Type |
|-----|------|
| 0 | |
| 1 | |
| 2 | |
| 3 | |
| 4 | W_Intensive |
| 5 | W_Intensive |
| ⋮ | |

HOST: R_Intensive[3] →

| LBA | Type |
|-----|------|
| 0 | |
| 1 | |
| 2 | |
| 3 | R_Intensive |
| 4 | W_Intensive |
| 5 | W_Intensive |
| ⋮ | |

FIG.11

| BLK | Read_Retry_CNT | Error_Bit_Rate | TR | Program_Cycle_CNT | TPROG |
|---|---|---|---|---|---|
| BLK_1 | 3 | 2% | 27μs | 4 | 1200μs |
| BLK_2 | 5 | 3% | 28μs | 3 | 1100μs |
| BLK_3 | 1 | 2% | 22μs | 4 | 1100μs |
| ⋮ | ⋮ | ⋮ | ⋮ | ⋮ | ⋮ |
| BLK_N-2 | 2 | 2% | 24μs | 4 | 1300μs |
| BLK_N-1 | 0 | 0 | 20μs | 2 | 1200μs |
| BLK_N | 6 | 3% | 29μs | 1 | 1400μs |

| AVG | 2.83 | 2% | 25μs | 3 | 1217μs |

R_Intensive

| BLK | Read_Retry_CNT | Error_Bit_Rate | TR | Program_Cycle_CNT | TPROG |
|---|---|---|---|---|---|
| BLK_1 | 3 | 2% | 27μs | 4 | 1200μs |
| BLK_2 | 5 | 3% | 28μs | 3 | 1100μs |
| BLK_3 | 1 | 2% | 22μs | 4 | 1100μs |
| ⋮ | ⋮ | ⋮ | ⋮ | ⋮ | ⋮ |
| BLK_N-2 | 2 | 2% | 24μs | 4 | 1300μs |
| BLK_N-1 | 0 | 0 | 20μs | 2 | 1200μs |
| BLK_N | 6 | 3% | 29μs | 1 | 1400μs |
| AVG | 2.83 | 2% | 25μs | 3 | 1217μs |

1st TAR_BLK  One of BLK_3, BLK_N-2 and BLK_N-1

W_Intensive

| BLK | Read_Retry_CNT | Error_Bit_Rate | TR | Program_Cycle_CNT | TPROG |
|---|---|---|---|---|---|
| BLK_1 | 3 | 2% | 27µs | 4 | 1200µs |
| BLK_2 | 5 | 3% | 28µs | 3 | 1200µs |
| BLK_3 | 1 | 2% | 22µs | 4 | 1400µs |
| ⋮ | ⋮ | ⋮ | ⋮ | ⋮ | ⋮ |
| BLK_N-2 | 2 | 2% | 24µs | 4 | 1300µs |
| BLK_N-1 | 0 | 0 | 20µs | 2 | 1100µs |
| BLK_N | 6 | 3% | 29µs | 1 | 1100µs |
| AVG | 2.83 | 2% | 25µs | 3 | 1217µs |

2nd TAR_BLK ⟹ One of BLK_2, BLK_N-1 and BLK_N

MEMORY SYSTEM AND OPERATING METHOD OF MEMORY SYSTEM

CROSS-REFERENCE TO RELATED APPLICATION

The present application claims priority under 35 U.S.C. 119(a) to Korean patent application number 10-2021-0133886 filed on Oct. 8, 2021, which is incorporated herein by reference in its entirety.

TECHNICAL FIELD

Various embodiments of the present disclosure relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

A memory controller may secure a spare memory block by erasing data of the corresponding memory block after writing valid data among data stored in one memory block to another memory block.

SUMMARY

In one aspect, embodiments of the present disclosure may provide a memory system including a memory device including a plurality of memory blocks, and a memory controller configured to control the memory device to write the data, which is stored in the memory device, to a first target memory block or a second target memory block among the plurality of memory blocks according to whether a data type of the data is a read-intensive type or a write-intensive type.

In another aspect, embodiments of the present disclosure may provide an operating method of a memory system including determining whether a data type of data stored in a memory device including a plurality of memory blocks is a read-intensive type or a write-intensive type, and writing the data to a first target memory block or a second target memory block among the plurality of memory blocks according to the data type of the data.

According to embodiments of the present disclosure, it is possible to improve the durability and reliability of the memory device performing a write operation in consideration of the data type of data in the memory device.

BRIEF DESCRIPTION OF THE DRAWINGS

FIG. 5 illustrates an operation of increasing a read command count and a write command count by a memory system according to embodiments of the present disclosure.

FIG. 6 illustrates an example of an operation in which the memory system updates a read command count or a write command count according to embodiments of the present disclosure.

FIG. 7 illustrates an example of determining a data type by a memory system according to embodiments of the present disclosure.

FIG. 9 illustrates an example in which a memory system directly receives data type information from a host according to embodiments of the present disclosure.

FIG. 11 illustrates an example of performance characteristics according to embodiments of the present disclosure.

DETAILED DESCRIPTION

Figure 1:
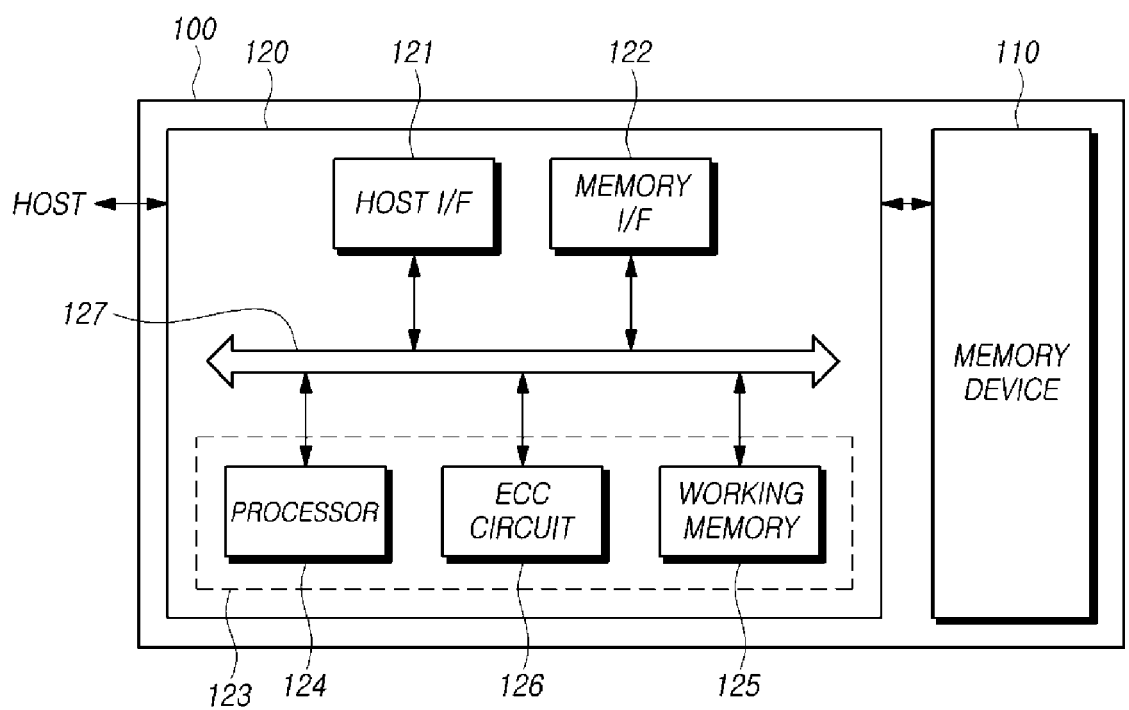
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory device having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
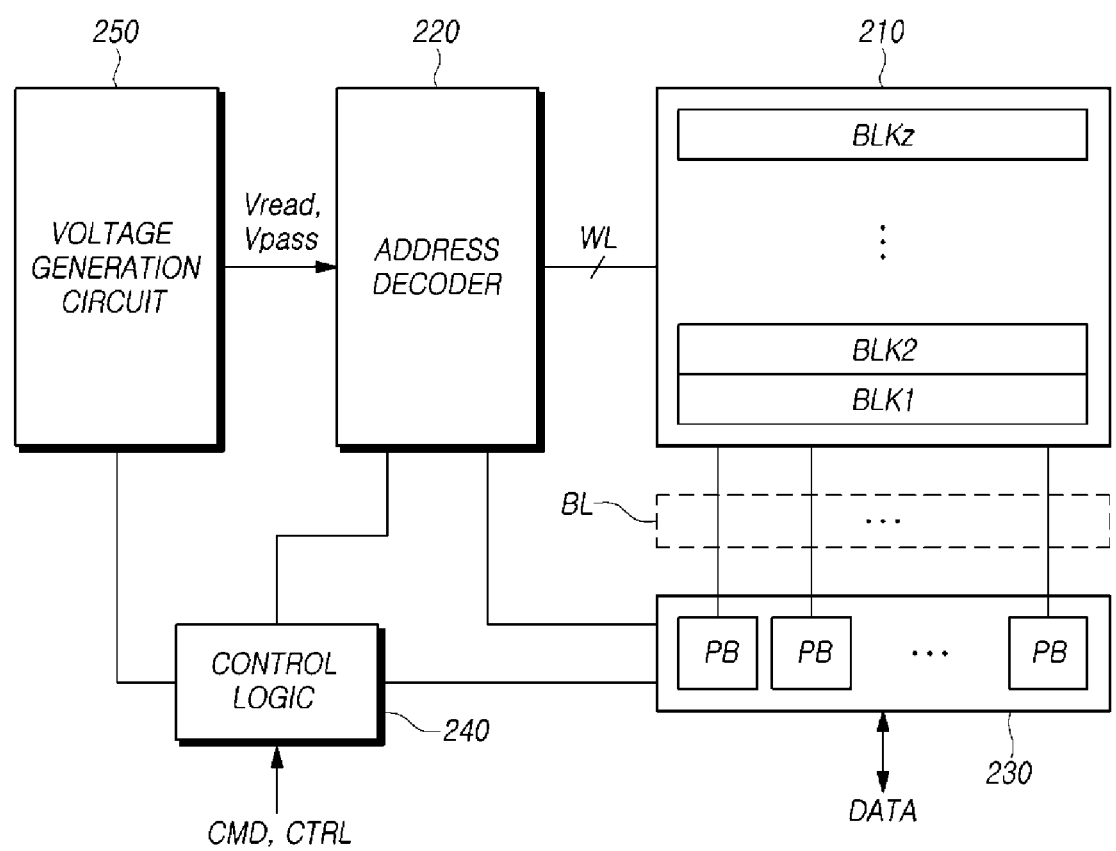
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
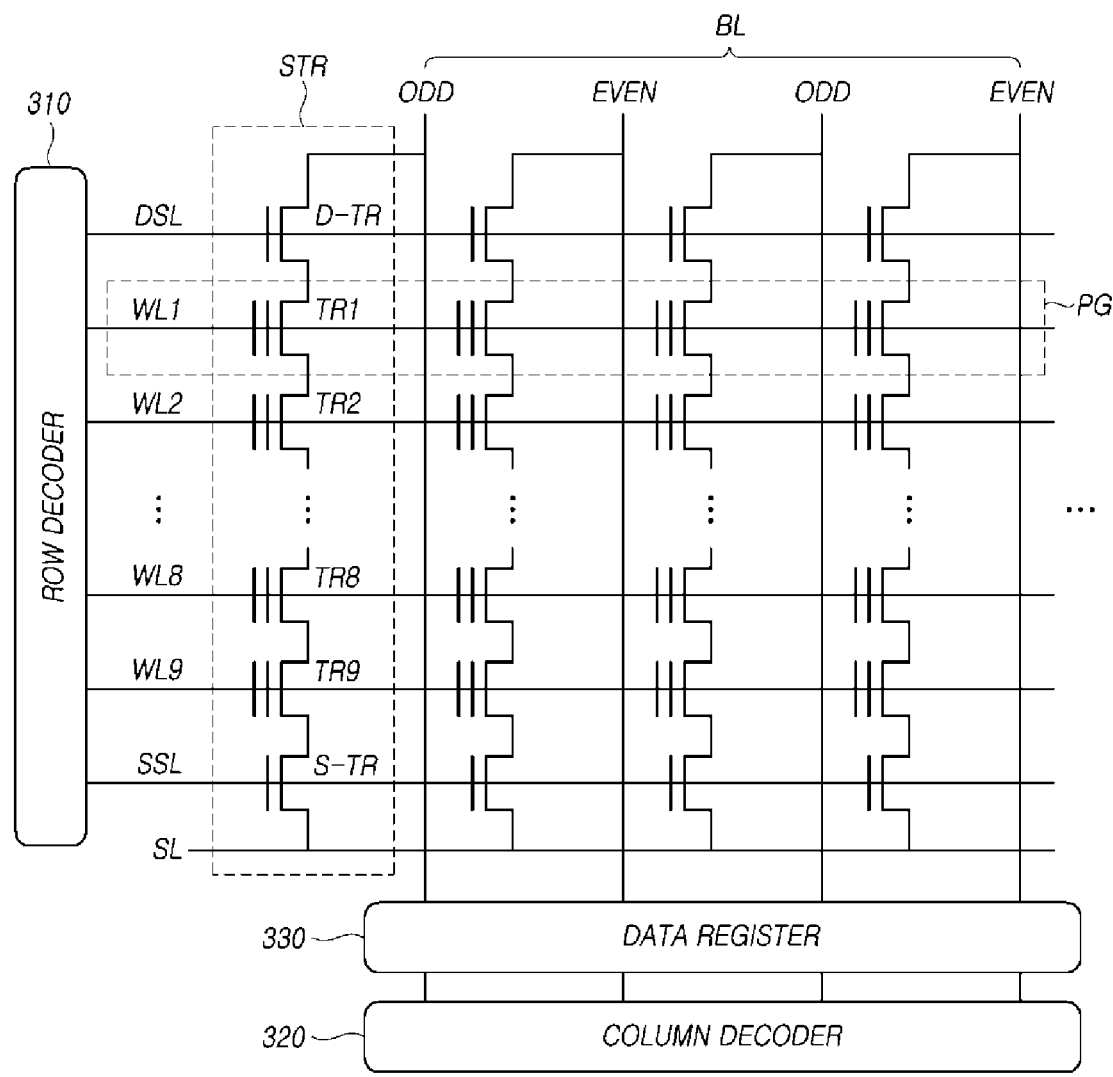
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage $V_{CC}$ to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
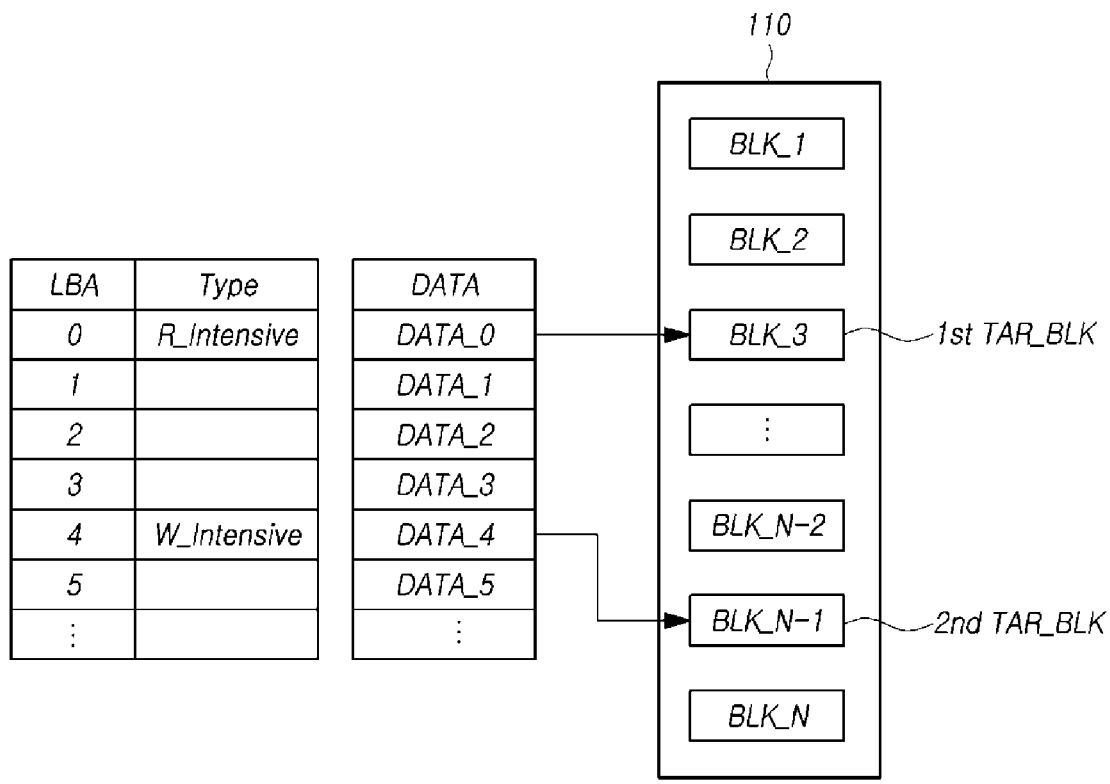
FIG. 4 illustrates a schematic operation of a memory system according to embodiments of the present disclosure.

FIG. 4 illustrates a schematic operation of a memory system 100 according to embodiments of the present disclosure.

Referring to FIG. 4, the memory controller 120 may determine that data corresponding to a logical block address LBA 0 is a read-intensive type R_Intensive. In this case, the memory controller 120 may determine a memory block BLK_3 as a first target memory block $1^{st}$_TAR_BLK and write the data DATA_0 corresponding to the logical block address LBA 0 to the memory block BLK_3.

In the case that the memory controller 120 performs a garbage collection for moving valid data from a source block to a destination block in the background, the memory controller 120 may write only valid data among data stored in the source block, which is a memory block mapped to logical block address LBA 0, to the memory block BLK_3 serving as the destination block.

The memory controller 120 may determine that the data DATA_4 corresponding to a logical block address LBA 4 is the write-intensive type W_Intensive. In this case, the memory controller 120 may determine a memory block BLK_N−1 as a second target memory block $2^{nd}$_TAR_BLK, and write data corresponding to the logical block address LBA 4 to the memory block BLK_N−1.

As described above, when the memory controller 120 performs the garbage collection in the background, the memory controller 120 may write only valid data among data stored in the source block, which is a memory block mapped to logical block address LBA 4, to the memory block BLK_N−1 serving as the destination block.

The memory controller 120 may determine the first target memory block $1^{st}$_TAR_BLK and the second target memory block $2^{nd}$_TAR_BLK as a memory block advantageous for storing data of the read-intensive type and data of write-intensive type, respectively.

Accordingly, when writing data to the memory device 110, the memory controller 120 may write the corresponding data to a memory block advantageous for storing the corresponding data based on the data type of the corresponding data. As a result, the memory controller 120 may balance the operation of the plurality of memory blocks included in the memory device 110. In addition, the memory controller 120 may improve durability and reliability of the memory device 110.

Hereinafter, specific embodiments in which the memory system 100 determines whether the data type is a read-intensive type R_Intensive or a write-intensive type W_Intensive, will be described.

FIG. 5 illustrates an operation of increasing a read command count and a write command count by a memory system 100 according to embodiments of the present disclosure.

Referring to FIG. 5, the memory controller 120 of the memory system 100 may receive a read command R_CMD or a write command W_CMD from a host HOST.

In addition, the memory controller 120 of the memory system 100 may determine a data type as a read-intensive type R_Intensive or a write-intensive type W_Intensive based on a read command count which is a number of accesses to the data in response to the read command R_CMD corresponding to the logical block address LBA of data or a write command count which is a number of accesses to the data in response to the write command W_CMD corresponding to the logical block address LBA of the data.

As described above, the memory controller 120 may control the operation of the memory device 110 according to a request from the host HOST. The memory controller 120 may receive the read command R_CMD or the write command W_CMD from the host HOST through a host interface 121.

When transmitting the read command R_CMD, the host HOST may transmit information about a logical block address LBA of data read by the read command R_CMD to the memory controller 120. The memory controller 120 may respond to the host HOST by reading data stored in a physical block address corresponding to the logical block address LBA according to the request of the host HOST.

In addition, when transmitting the write command W_CMD, the host HOST may transmit information on the logical block address LBA of data written by the write command W_CMD to the memory controller 120. The memory controller 120 may write data to a physical block address corresponding to the corresponding logical block address LBA according to a request from the host HOST.

The read command count means the number of times the host HOST accesses a specific logical block address LBA through the read command R_CMD.

The write command count means the number of times the host HOST accesses a specific logical block address LBA through the write command.

Referring to a table TBL_1 indicating read command counts and write command counts for each logical block address LBA of the before in FIG. 5, the host HOST accessed the logical block addresses LBA 0 and LBA 1 51 times through the read command, respectively. In addition, the host HOST accessed the logical block address LBA 3 10 times through the write command.

In FIG. 5, the memory controller 120 has received a read command R_CMD[0, 1] corresponding to the logical block address LBA 0 and LBA 1 from the host HOST, and has received a write command W_CMD[3] corresponding to logical block address LBA 3.

Referring to a table TBL_2 indicating read command counts and write command counts per logical block address after receiving the read command R_CMD[0, 1] and the write command W_CMD[3] from the host, there may be confirmed that the read command count for the logical block address LBA 0 and LBA 1 increases by 1 to become 52, and the write command count for the logical block address LBA 3 increases by 1 to become 11.

The memory controller 120 may determine the data type of data corresponding to each logical block address LBA based on the read command count or the write command count. For example, the memory controller 120 determines that data corresponding to a logical block address having a large read command count is a data of the read-intensive type R_Intensive, and data corresponding to a logical block address having a large write command count is the data of a write-intensive type W_Intensive.

The memory controller 120 may utilize various methods when determining the data type of data stored in the memory device 110 based on the read command count or the write command count for each logical block address LBA.

For example, if the read command count or the write command count of the logical block address is equal to or greater than a set threshold count, the memory controller 120 may determine the data corresponding to the corresponding logical block address as a read-intensive type R_Intensive or a write-intensive type W_Intensive.

As another example, the memory controller 120 may determine the data corresponding to a logical block address LBA corresponding to a predetermined upper ratio of the read command count or the write command count as a read-intensive type R_Intensive or a write-intensive type W_Intensive.

FIG. 6 illustrates an example of an operation in which the memory system 100 updates a read command count or a write command count according to embodiments of the present disclosure.

Referring to FIG. 6, if the read command count corresponding to the logical block address LBA corresponding to the data stored in the memory device 110 is equal to or greater than a first threshold count 1st_Threshold, the memory controller 120 of the memory system 100 may determine the data type as a read-intensive type R_Intensive.

In addition, if the write command count corresponding to the logical block address LBA corresponding to the data stored in the memory device 110 is equal to or greater than a second threshold count 2nd_Threshold, the memory controller 120 of the memory system 100 may determine the data type as a write-intensive type R_Intensive.

In FIG. 6, the first threshold count 1st_Threshold is set to 53.

When receiving a read command R_CMD[0, 1] for the logical block address LBA 0 and LBA 1 from the host HOST, the memory controller 120 may increment the read command count for the corresponding logical block address LBA from 52 to 53. Since the read command count for the logical block address LBA 0 and LBA 1 is 53 or greater, which is the first threshold count 1st_Threshold, the memory controller 120 may determine the data type of data corresponding to the corresponding logical block address LBA as the read-intensive type R_Intensive.

In FIG. 6, the second threshold count 2nd_Threshold is set to 12.

When receiving a write command W_CMD[3] for the logical block address LBA 3 from the host HOST, the memory controller 120 may increment the write command count for the corresponding logical block address LBA from 11 to 12. Since the write command count for the logical block address LBA 3 is 12 or greater, which is the second threshold count 2nd_Threshold, the memory controller 120 may determine the data type of data corresponding to the corresponding logical block address LBA as the write-intensive type W_Intensive.

FIG. 7 illustrates an example of determining a data type by a memory system 100 according to embodiments of the present disclosure.

As shown in FIG. 7, the memory controller 120 of the memory system 100 may indicate the data type corresponding to the logical block addresses LBA 0 and LBA 1 as the read-intensive type R_Intensive on the table for matching the logical block address LBA and the data type.

Similarly, the memory controller 120 may indicate the data type corresponding to the logical block addresses LBA 3 as the write-intensive type W_Intensive on the table for matching the logical block address LBA and the data type.

In the case that, for a specific logical block address, the read command count is equal to or greater than the first threshold count 1st_Threshold and the write command count is equal to or greater than the second threshold count 2nd_Threshold, so that the data type is determined to be both a read-intensive type R_Intensive and a write-intensive type W_Intensive, the memory controller 120 may indicate the data type corresponding to the corresponding logical block address on a table for matching the logical block address LBA and the data type according to a specific priority. The memory controller 120 may determine the first target memory block $1^{st}\_TAR\_BLK$ or the second target memory block $2^{nd}\_TAR\_BLK$ with reference to this. For example, if the priority of the read-intensive type R_Intensive is higher than the write-intensive type W_Intensive, the memory controller 120 may indicate the data type as the read-intensive type R_Intensive on the table. In this case, the corresponding data may be written to the first target memory block $1^{st}\_TAR\_BLK$ to which the read-intensive type R_Intensive data is written.

As another example, in the case that the read command count of the specific logical block address LBA is greater than or equal to the first threshold count 1st_Threshold, so that the data type of data corresponding to the logical block address LBA is determined as the read-intensive type R_Intensive, and then the write command count of the corresponding logical block address LBA is greater than or equal to the second threshold count 2nd_Threshold, the memory controller 120 may change the data type corresponding to the corresponding logical block address LBA from the read-intensive type R_Intensive to the write-intensive type W_Intensive. Accordingly, it is possible to prevent the corresponding data type from being simultaneously determined to be both the read-intensive type R_Intensive and the write-intensive type W_Intensive.

Accordingly, the memory controller 120 may calculate a read command count and a write command count according to the command received from the host HOST, determine whether each is equal to or greater than the first threshold count 1st_Threshold or the second threshold count 2nd_Threshold, so that may determine the data type of the corresponding data as a read-intensive type R_Intensive or a write-intensive type W_Intensive.

Figure 8:
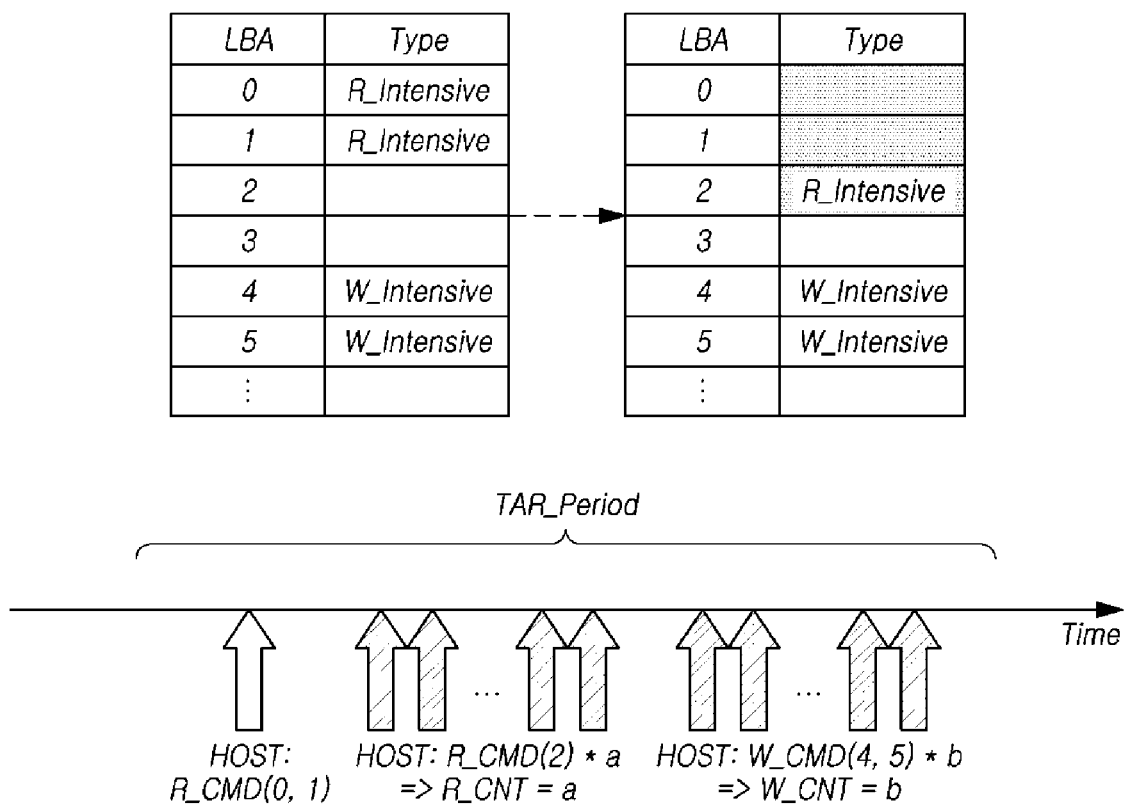
FIG. 8 illustrates an example of monitoring a command received from a host during a target time period by a memory system according to embodiments of the present disclosure.

FIG. 8 illustrates an example of monitoring a command received from a host HOST during a target time period TAR_Period by a memory system 100 according to embodiments of the present disclosure.

Referring to FIG. 8, a read command count or a write command count may be monitored for a set target time period.

In FIG. 8, the memory system 100 has received, during the target time period TAR_Period, the read command R_CMD[0, 1] for the logical block addresses LBA 0 and LBA 1 once, the read command R_CMD[2] for the logical block address LBA 2 the "a" times, and the write command W_CMD[4, 5] for logical block addresses LBA 4 and LBA 5 the "b" times. In this case, "a" is equal to or greater than the above-described first threshold count and "b" is equal to or greater than the above-described second threshold count.

The data type corresponding to the logical block address LBA 0 and LBA 1 has been determined to be a read-intensive type R_Intensive. However, the memory controller 120 may determine that data corresponding to logical block addresses LBA 0 and LBA 1 is a read-intensive type R_Intensive, but a result of monitoring the read command R_CMD received from the host HOST during the target time period TAR_Period, the corresponding data no longer corresponds to the read-intensive type R_Intensive. Accordingly, the memory controller 120 may determine that the data corresponding to the logical block addresses LBA 0 and LBA 1 is not the read-intensive type R_Intensive.

Since the memory controller 120 receives the read command from the host HOST with respect to the logical block address LBA 2 "a" times, the memory controller 120 may determine the data type corresponding to the logical block address LBA 2 as the read-intensive type R_Intensive. When writing data corresponding to the logical block address LBA 2 to another memory block, the memory controller 120 may control the memory device 110 to write the data to the first target memory block 1$^{st}$_TAR_BLK.

Since the memory controller 120 receives the write command b times from the host with respect to the logical block addresses LBA 4 and LBA 5, the memory controller may determine the data type corresponding to the logical block addresses LBA 4 and LBA 5 as the write-intensive type W_Intensive. Since the data type is determined as the write-intensive type W_Intensive for the logical block addresses LBA 4 and LBA 5, the memory controller 120 may maintain the corresponding data type without changing the data type. When writing data corresponding to logical block addresses LBA 4 and LBA 5 to other memory blocks, the memory controller 120 may control the memory device 110 to write data to the second target memory block 2$^{nd}$_TAR_BLK.

As described above, the memory controller 120 may determine the data type of data stored in the memory device 110 based on the monitoring result for the target time period TAR_Period. Accordingly, the memory controller 120 may update the data type of data stored in the memory device 110 for each target time period TAR_Period, thereby reflecting the change in the data type in real time.

In addition, the memory system 100 may, instead of determining the data type of data based on the read command R_CMD or the write command (W_CMD) received from the host HOST as described above, directly receive information about the data type of data from the host HOST.

FIG. 9 illustrates an example in which a memory system 100 directly receives type information of the data from a host according to embodiments of the present disclosure.

Referring to FIG. 9, the memory controller 120 of the memory system 100 may receive type information of data stored in the memory device 110 from the host HOST, and determine the data type of data stored in the memory device 110 as a read-intensive type R_Intensive or a write-intensive type W_Intensive based on the received type information.

The host may predict a read request or a write request that is likely to occur in the future based on the characteristics (e.g., format) of the data. Accordingly, the host may directly transmit information designating the data type for data stored in the memory system 100.

The memory controller 120 may receive information designating a data type and reflect the information for each logical block address LBA. In addition, when the memory controller 120 writes data stored in the memory device 110 to the memory block, the memory controller 120 may write the data to the first target memory block 1$^{st}$_TAR_BLK or the second target memory block 2$^{nd}$_TAR_BLK according to the data type.

As an example, the memory controller 120 may receive type information R_intensive[3] indicating that data corresponding to the logical block address LBA 3 is a read-intensive type R_Intensive from the host HOST. The memory controller 120 may determine that the data type of data corresponding to the logical block address LBA 3 is the read-intensive type R_Intensive based on the received type information.

In addition, when the memory controller 120 receives the type information designating a data type along with the write command W_CMD from the host HOST and writes data to the memory device 110, the memory controller 120 may write data to the first target memory block 1$^{st}$_TAR_BLK or the second target memory block 2$^{nd}$_TAR_BLK according to the designated data type.

As a result, the memory controller 120 may determine the data type of data stored in the memory device 110 without separately calculating the read command count or the write command count.

Figure 10:
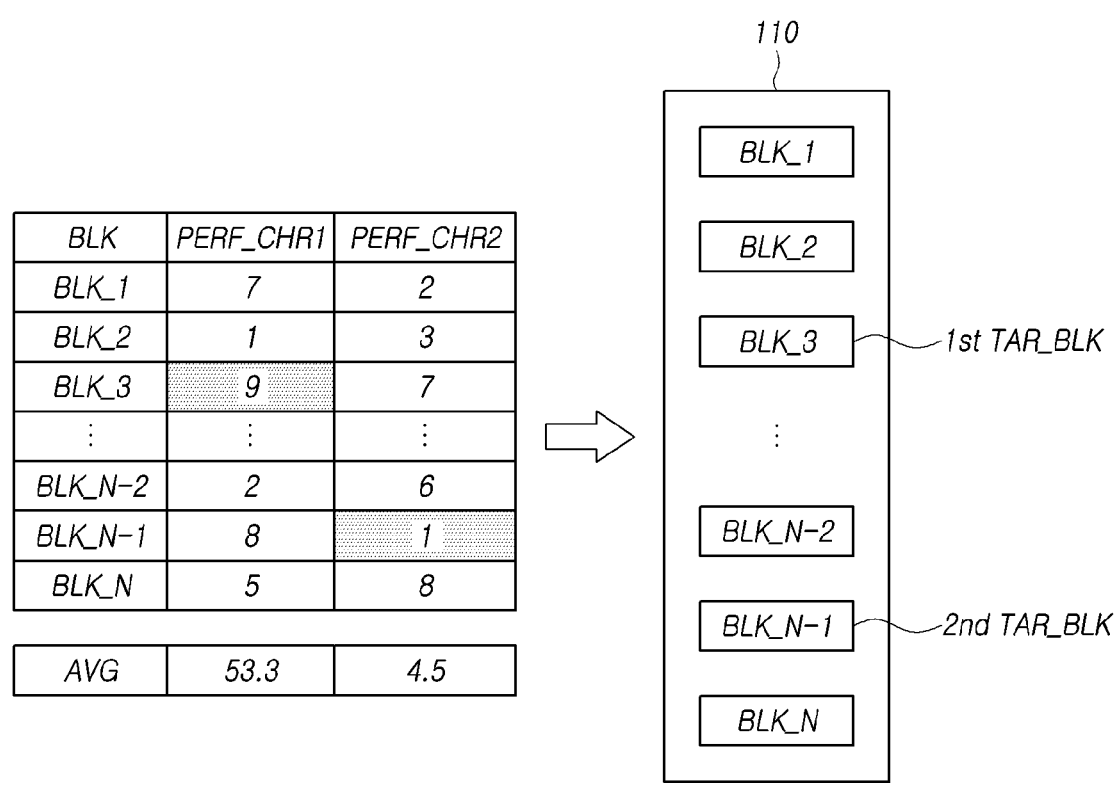
FIG. 10 illustrates an example of an operation in which a memory system determines a first target memory block or a second target memory block according to embodiments of the present disclosure.

FIG. 10 illustrates an example of an operation in which a memory system 100 determines a first target memory block 1$^{st}$_TAR_BLK or a second target memory block 2$^{nd}$_TAR_BLK according to embodiments of the present disclosure.

Referring to FIG. 10, the memory controller 120 of the memory system 100 may determine the first target memory block 1$^{st}$_TAR_BLK or the second target memory block 2$^{nd}$_TAR_BLK based on the performance characteristics of the plurality of memory blocks BLK_1, BLK_2, BLK_3, . . . , BLK_N−2, BLK_N−1, BLK_N included in the memory device 110.

The performance characteristic may be an index indicating the physical performance of a memory block. For example, the performance characteristics may include at least one of a read retry count, an error bit rate, a read time required to read data, a program cycle count that occur when writing data, and a program time required to write data.

The memory controller 120 may determine a read-robust memory block having high read operation performance as the first target memory block 1$^{st}$_TAR_BLK based on performance characteristics related to the read operation. Furthermore, the memory controller 120 may determine a write-robust memory block having high write operation performance as the second target memory block 2$^{nd}$_TAR_BLK based on performance characteristics related to the write operation.

Referring to the table shown in FIG. 10, there are recorded a first performance characteristic PERF_CHR1 and a second performance characteristic PERF_CHR2 for each memory block BLK.

For example, the memory block BLK having the high first performance characteristic PERF_CHR1 may be a read-robust memory block with high physical performance required to perform the read operation when the memory controller 120 performs a read operation on the memory device 110. The memory controller 120 may determine the memory block BLK_3 having the highest first performance characteristic PERF_CHR1 as the first target memory block 1$^{st}$_TAR_BLK.

As another example, the memory block BLK having the low second performance characteristic PERF_CHR2 may be a write-robust memory block with high physical performance required to perform the write operation when the memory controller 120 performs a write operation on the memory device 110. The memory controller 120 may determine the memory block BLK_N−1 having the lowest second performance characteristic PERF_CHR2 as the second target memory block 2$^{nd}$_TAR_BLK.

The memory controller 120 may set criteria or reference for the plurality of memory blocks BLK_1, BLK_2, BLK_3, . . . , BLK_N−2, BLK_N−1, BLK_N based on the performance characteristics of each of the plurality of memory blocks BLK_1, BLK_2, BLK_3, . . . , BLK_N−2, BLK_N−1, BLK_N included in the memory device 110. In addition, the memory controller 120 may separately manage memory blocks having high or low performance characteristics based on the set reference.

For example, the reference for evaluating the physical performance of the plurality of memory blocks BLK_1, BLK_2, BLK_3, . . . , BLK_N−2, BLK_N−1, BLK_N may be an average value AVG of physical performance for a plurality of memory blocks. The average value AVG may be an arithmetic mean or a geometric mean.

FIG. 11 illustrates an example of performance characteristics according to embodiments of the present disclosure.

Referring to FIG. 11, the performance characteristic may include one of a read retry count Read_Retry_CNT, an error bit rate Error_Bit_Rate, a read time TR, a program cycle count Program_Cycle_CNT, or a program time TPROG.

Since the data of the read-intensive type R_Intensive is data with a high probability that a read operation is requested from the host HOST, the memory controller 120 may write the data of the read-intensive type R_Intensive to a read-robust memory block having high read operation performance.

When the memory controller 120 fails to correct an error in the process of reading data stored in the memory device 110, the read operation is performed by changing the read voltage Vread. In this way, attempting a read operation while changing the read voltage Vread may be referred as a read retry. A memory block having a high read retry count may be treated as a memory block vulnerable to a read operation.

The error bit rate Error_Bit_Rate refers to a ratio of error bits generated per memory block when the memory controller 120 reads data stored in the memory device 110. A memory block having a high error bit rate may be treated as a memory block vulnerable to a read operation.

The read time TR is the time required to read data, and may be defined as the time required to read the data stored in the memory cell to the page buffer PB or the time required to read the data by the memory system 100. The read time TR is a main factor in determining read speed. A memory block having a long read time TR may be treated as a memory block vulnerable to a read operation.

Since the data of the write-intensive type W_Intensive is data with a high possibility of requesting a write operation from the host HOST, the memory controller 120 may write data of the write-intensive type W_Intensive to a write-robust memory block having high write operation performance.

When the memory controller 120 writes data to the memory device 110, the memory controller 120 may repeatedly perform a plurality of program operations to narrow the threshold voltage distribution formed in the memory cells in the memory device 110. In this case, one program operation may be referred to as a program cycle. The program cycle count Program_Cycle_CNT for each memory block may be set differently according to the physical characteristics of each memory block. A memory block having a high program cycle count may be treated as a memory block vulnerable to a write operation.

The program time TPROG may be the time required to write data of one page to the memory cell. Alternatively, the program time TPROG may be the time between when the write command W_CMD is received from the host and when the memory system 100 sends a response indicating the completion of the write operation to the host. A memory block having a long program time may be treated as a memory block vulnerable to a write operation.

Figure 12:
FIG. 12 illustrates an example in which a memory system determines a first target memory block according to embodiments of the present disclosure.

FIG. 12 illustrates an example in which a memory system 100 determines a first target memory block $1^{st}$_TAR_BLK according to embodiments of the present disclosure.

Referring to FIG. 12, if the data type of data stored in the memory device 110 is the read-intensive type R_Intensive, the memory controller 120 of the memory system 100 may determine, as the first target memory block $1^{st}$_TAR_BLK, one of the read-robust memory blocks having the read retry count Read_Retry_CNT equal to or less than the average value AVG of the read retry counts of the plurality of memory blocks BLK_1, BLK_2, BLK_3, . . . , BLK_N−2, BLK_N−1, BLK_N included in the memory device 110.

In FIG. 12, the average value AVG of the read retry counts of the plurality of memory blocks BLK_1, BLK_2, BLK_3, . . . , BLK_N−2, BLK_N−1, BLK_N included in the memory device 110 is 2.83. In FIG. 12, since a memory block BLK_3, a memory block BLK_N−2 and a memory block BLK_N−1 have the read retry count Read_Retry_CNT of 1, 2, and 0, respectively, which is equal to or less than the average value AVG of 2.83, the memory controller 120 may determine one of the memory block BLK_3, the memory block BLK_N−2 and the memory block BLK_N−1 as the first target memory block $1^{st}$_TAR_BLK. A memory block having a read retry count less than or equal to the average value AVG of the read retry counts Read_Retry_CNT of the plurality of memory blocks BLK_1, BLK_2, BLK_3, . . . , BLK_N−2, BLK_N−1, BLK_N may be treated as a read-robust memory block having excellent performance when performing a read operation.

In addition, in FIG. 12, the average value of error bit rates of the plurality of memory blocks BLK_1, BLK_2, BLK_3, . . . , BLK_N−2, BLK_N−1, BLK_N included in the memory device 110 is 2%. In FIG. 12, the memory block BLK_1, the memory block BLK_3, the memory block BLK_N−2, and the memory block BLK_N−1 have error bit rates of 2%, 2%, 2%, and 0, respectively, which is equal to or less than the average value AVG of 2%. The memory controller 120 may determine one of the memory block BLK_3, the memory block BLK_N−2 and the memory block BLK_N−1 as the first target memory block $1^{st}$_TAR_BLK. A memory block having an error bit rate less than or equal to the average value AVG of the error bit rates Error_Bit_Rate of the plurality of memory blocks BLK_1, BLK_2, BLK_3, . . . , BLK_N−2, BLK_N−1, BLK_N may be treated as a read-robust memory block having excellent performance when performing a read operation.

In addition, in FIG. 12, the average value of read times of the plurality of memory blocks BLK_1, BLK_2, BLK_3, . . . , BLK_N−2, BLK_N−1, BLK_N included in the memory device 110 is 25 μs. In FIG. 12, the memory block BLK_1, the memory block BLK_3, the memory block BLK_N−2, and the memory block BLK_N−1 have the read time of 22 μs, 24 μs, 20 μs, respectively, which is equal to or less than the average value AVG of 25 μs. The memory controller 120 may determine one of the memory block BLK_3, the memory block BLK_N−2 and the memory block BLK_N−1 as the first target memory block $1^{st}$_TAR_BLK. A memory block having the read time less than or equal to the average value AVG of the read times of the plurality of memory blocks BLK_1, BLK_2, BLK_3, . . . , BLK_N−2, BLK_N−1, BLK_N may be treated as a read-robust memory block having excellent performance when performing a read operation.

Figure 13:
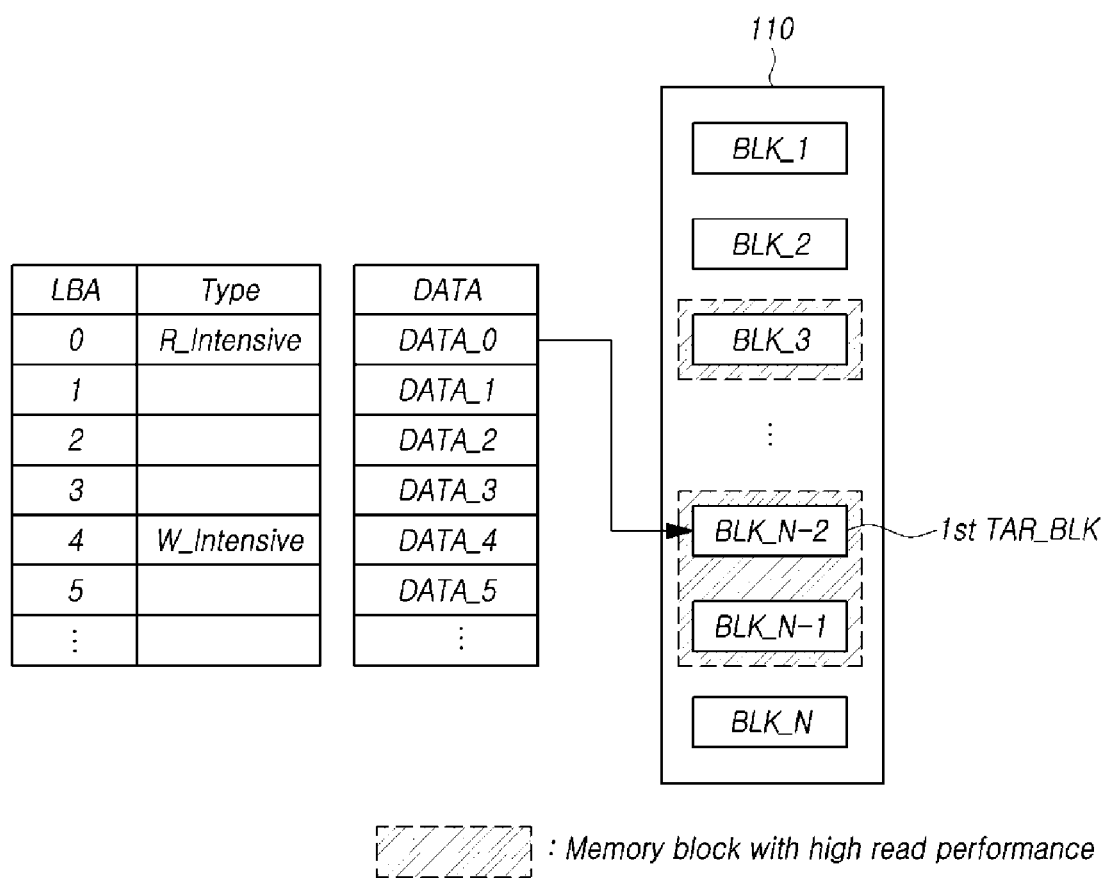
FIG. 13 illustrates an example of an operation in which a memory system writes read-intensive type data to a first target memory block according to embodiments of the present disclosure.

FIG. 13 illustrates an example of an operation in which a memory system 100 writes the data of the read-intensive R-intensive type to a first target memory block $1^{st}$_TAR_BLK according to embodiments of the present disclosure.

When the memory controller 120 writes the data DATA_0 corresponding to the logical block address LBA 0 of FIG. 13 to the memory block, the memory controller may confirm that the data type of the corresponding data is the read-intensive type R_Intensive. The memory controller 120 may determine, as the first target memory block $1^{st}$_TAR_BLK, the memory block BLK_N−2 among the memory block BLK_3, the memory block BLK_N−2 and the memory block BLK_N−1 having high read performance by referring to the read retry count which is one of the performance characteristics according to the data type, and may write data DATA_0 corresponding to logical block address LBA 0 to the memory block BLK_N−2.

In addition, the memory controller 120 may determine, as the first target memory block $1^{st}$_TAR_BLK, one of the memory block BLK_1, the memory block BLK_3, the memory block BLK_N−2 and the memory block BLK_N−1 which are the memory blocks having high read performance by referring to the error bit rate which is one of the performance characteristics according to the data type, and may write data DATA_0 corresponding to logical block address LBA 0 to the first target memory block $1^{st}$_TAR_BLK.

In addition, the memory controller 120 may determine, as the first target memory block $1^{st}$_TAR_BLK, one of the memory block BLK_3, the memory block BLK_N−2 and the memory block BLK_N−1 which are the memory blocks having high read performance by referring to the read time which is one of the performance characteristics according to the data type, and may write data DATA_0 corresponding to logical block address LBA 0 to the first target memory block $1^{st}$_TAR_BLK.

As described above, the memory controller 120 may improve the durability and reliability of the memory system 100 by writing data that is highly likely to request a read operation to a read-robust memory block having high read performance.

Figure 14:
FIG. 14 illustrates an example in which a memory system determines a second target memory block according to embodiments of the present disclosure.

FIG. 14 illustrates an example in which a memory system 100 determines a second target memory block $2^{nd}$_TAR_BLK according to embodiments of the present disclosure.

Referring to FIG. 14, if the data type of data stored in the memory device 110 is a write-intensive type W_Intensive, the memory controller 120 of the memory system 100 may determine, as the second target memory block $2^{nd}$_TAR_BLK, one of the write-robust memory blocks having the program cycle count Program_Cycle_CNT equal to or less than the average value AVG of the program cycle counts of the plurality of memory blocks BLK_1, BLK_2, BLK_3, . . . , BLK_N−2, BLK_N−1, BLK_N included in the memory device 110.

In FIG. 14, the average value AVG of the program cycle counts of the plurality of memory blocks BLK_1, BLK_2, BLK_3, . . . , BLK_N−2, BLK_N−1, BLK_N included in the memory device 110 is 3. In FIG. 14, since a memory block BLK_2, a memory block BLK_N−1 and a memory block BLK_N have the program cycle count Program_Cycle_CNT of 3, 2, and 1, respectively, which is equal to or less than the average value AVG of 3, the memory controller 120 may determine one of the memory block BLK_2, the memory block BLK_N−1 and the memory block BLK_N as the second target memory block $2^{nd}$_TAR_BLK. A memory block having a program cycle count Program_Cycle_CNT less than or equal to the average value AVG of the program cycle count Program_Cycle_CNT of the plurality of memory blocks BLK_1, BLK_2, BLK_3, . . . , BLK_N−2, BLK_N−1, BLK_N may be treated as a write-robust memory block having excellent performance when performing a write operation.

In addition, in FIG. 14, the average value AVG of the program times TPROG of the plurality of memory blocks BLK_1, BLK_2, BLK_3, . . . , BLK_N−2, BLK_N−1, BLK_N included in the memory device 110 is 1217 µs. In FIG. 14, the program times of a memory block BLK_1, a memory block BLK_2, a memory block BLK_N−1 and a memory block BLK_N is 1200 µs, 1200 µs, 1100 µs and 1100 µs, respectively, which is equal to or less than the average value AVG of 1217 µs. The memory controller 120 may determine one of the memory block BLK_1, the memory block BLK_2, the memory block BLK_N−1 and the memory block BLK_N as the second target memory block $2^{nd}$_TAR_BLK. A memory block having a program time less than or equal to the average value AVG of the program times of the plurality of memory blocks BLK_1, BLK_2, BLK_3, . . . , BLK_N−2, BLK_N−1, BLK_N may be treated as a write-robust memory block having excellent performance when performing a write operation.

Figure 15:
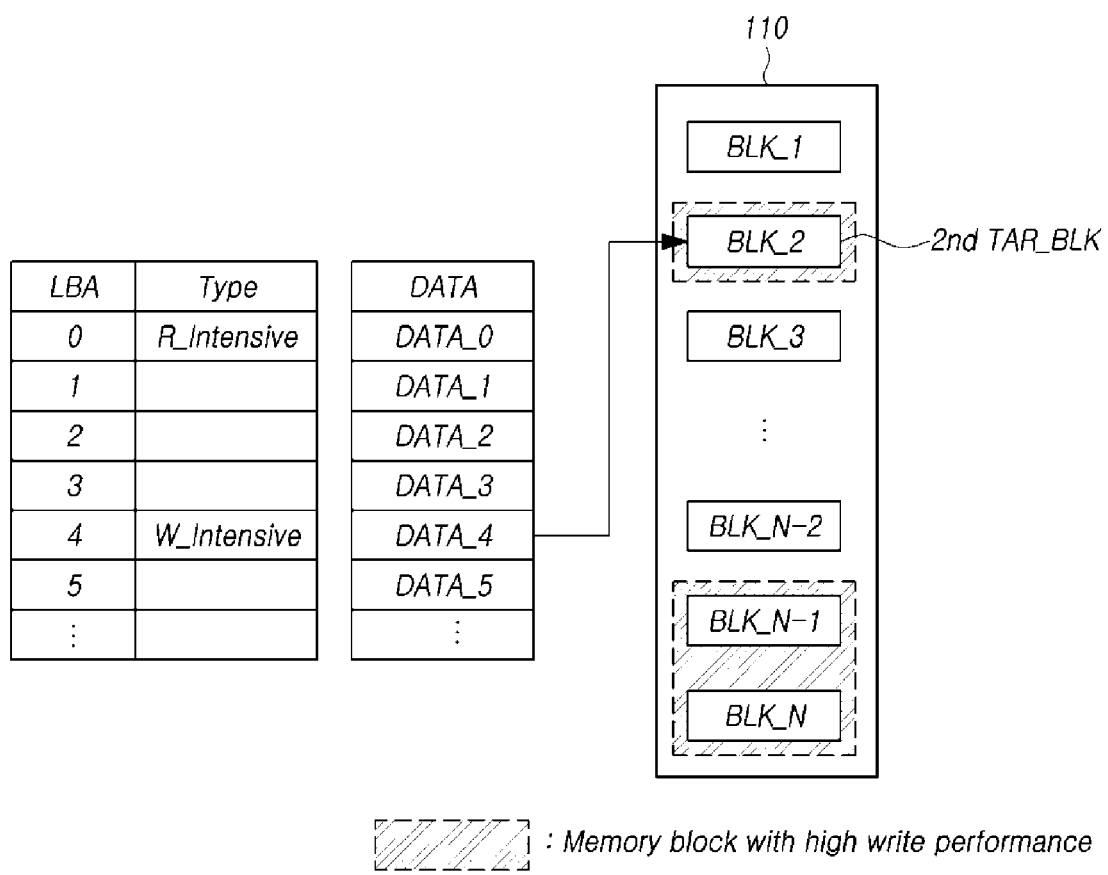
FIG. 15 illustrates an example of an operation in which a memory system writes write-intensive type data to a second target memory block according to embodiments of the present disclosure.

FIG. 15 illustrates an example of an operation in which a memory system 100 writes the data of the write-intensive type R_Intensive to a second target memory block $2^{nd}$_TAR_BLK according to embodiments of the present disclosure.

When the memory controller 120 writes the data corresponding to the logical block address LBA 4 of FIG. 14 to the memory block, the memory controller may confirm that the data type of the corresponding data is the write-intensive type W_Intensive. The memory controller 120 may determine, as the second target memory block $2^{nd}$_TAR_BLK, the memory block BLK_2 among the memory block BLK_2, the memory block BLK_N−1 and the memory block BLK_N having high write performance by referring to the program cycle count which is one of the performance characteristics according to the data type, and may write data DATA_4 corresponding to logical block address LBA 4 to the memory block BLK_2.

In addition, the memory controller 120 may determine, as the second target memory block $2^{nd}$_TAR_BLK, one of the memory block BLK_1, the memory block BLK_2, the memory block BLK_N−1 and the memory block BLK_N which are the memory blocks having high write performance by referring to the program time which is one of the performance characteristics according to the data type, and may write data DATA_4 corresponding to logical block address LBA 4 to the second target memory block $2^{nd}$_TAR_BLK.

As described above, the memory controller 120 may improve the durability and reliability of the memory system 100 by writing data that is highly likely to request a write operation to a write-robust memory block having high write performance.

Figure 16:
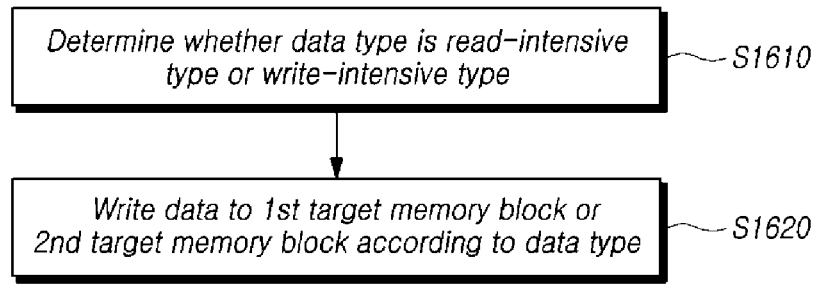
FIG. 16 illustrates an operating method of a memory system according to embodiments of the present disclosure.

FIG. 16 illustrates an operating method of a memory system 100 according to embodiments of the present disclosure.

Referring to FIG. 16, the operating method of a memory system 100 may include determining whether a data type of data stored in a memory device 110 including a plurality of memory blocks BLK_1, BLK_2, BLK_3, . . . , BLK_N−2, BLK_N−1, BLK_N is a read-intensive type R_Intensive or a write-intensive type W_Intensive (S1610).

In addition, the operating method of a memory system 100 may include writing, according to the data type of the data, the corresponding data to the first target memory block $1^{st}$_TAR_BLK or the second target memory block $2^{nd}$_TAR_BLK among the plurality of memory blocks BLK_1, BLK_2, BLK_3, . . . , BLK_N−2, BLK_N−1, BLK_N (S1620).

Meanwhile, operation S1610 may include, for example, receiving a read command R_CMD or a write command W_CMD from a host HOST.

In addition, the operation S1610 may include determining the data type, based on a read command count which is the number of accesses to the data in response to the read command R_CMD corresponding to a logical block address LBA of the data or a write command count which is the number of accesses to the data in response to the write command W_CMD corresponding to the logical block address LBA of the data, as the read-intensive type R_Intensive or the write-intensive type W_Intensive.

In determining the data type, the data type may be determined as the read-intensive type R_Intensive if the read command count corresponding to the logical block address of LBA of the data stored in the memory device 110 is equal to or greater than a first threshold count 1st_Threshold, and the data type may be determined as the write-intensive type W_Intensive if the write command count corresponding to the logical block address of LBA of the data stored in the memory device 110 is equal to or greater than a second threshold count 2nd_Threshold.

The read command count or the write command count is monitored during a set target time period TAR_Period.

In addition, the operation S1610 may include receiving type information of data stored in the memory device 110 from a host HOST.

Also, the operation S1610 may include determining the data type of the data stored in the memory device 110 as the read-intensive type R_Intensive or the write-intensive type W_Intensive based on the type information received from the host HOST.

The operation S1620 may include determining the first target memory block $1^{st}$_TAR_BLK or the second target memory block $2^{nd}$_TAR_BLK based on performance characteristics of the plurality of memory blocks BLK_1, BLK_2, BLK_3, . . . , BLK_N–2, BLK_N–1, BLK_N included in the memory device 110.

In this case, the performance characteristic may include one of a read retry count Read_Retry_CNT, an error bit rate Error Bit Rate, a read time TR, a program cycle count Program_Cycle_CNT, and a program time TPROG.

For example, determining the first target memory block $1^{st}$_TAR_BLK or the second target memory block $2^{nd}$_TAR_BLK may include, when the data type of the data stored in the memory device 110 is the read-intensive type R_Intensive, determining, as the first target memory block $1^{st}$_TAR_BLK, one of read-robust memory blocks having a read retry count Read_Retry_CNT, an error bit rate Error Bit Rate or a read time TR equal to or less than an average value of the same for the plurality of memory blocks BLK_1, BLK_2, BLK_3, . . . , BLK_N–2, BLK_N–1, BLK_N from among the plurality of memory blocks BLK_1, BLK_2, BLK_3, . . . , BLK_N–2, BLK_N–1, BLK_N.

As another example, determining the first target memory block $1^{st}$_TAR_BLK or the second target memory block $2^{nd}$_TAR_BLK may include, when the data type of the data stored in the memory device 110 is the write-intensive type W_Intensive, determining, as the second target memory block $2^{nd}$_TAR_BLK, one of write-robust memory blocks having a program cycle count Program_Cycle_CNT or a program time TPROG equal to or less than an average value of the same for the plurality of memory blocks BLK_1, BLK_2, BLK_3, . . . , BLK_N–2, BLK_N–1, BLK_N from among the plurality of memory blocks BLK_1, BLK_2, BLK_3, . . . , BLK_N–2, BLK_N–1, BLK_N.

Figure 17:
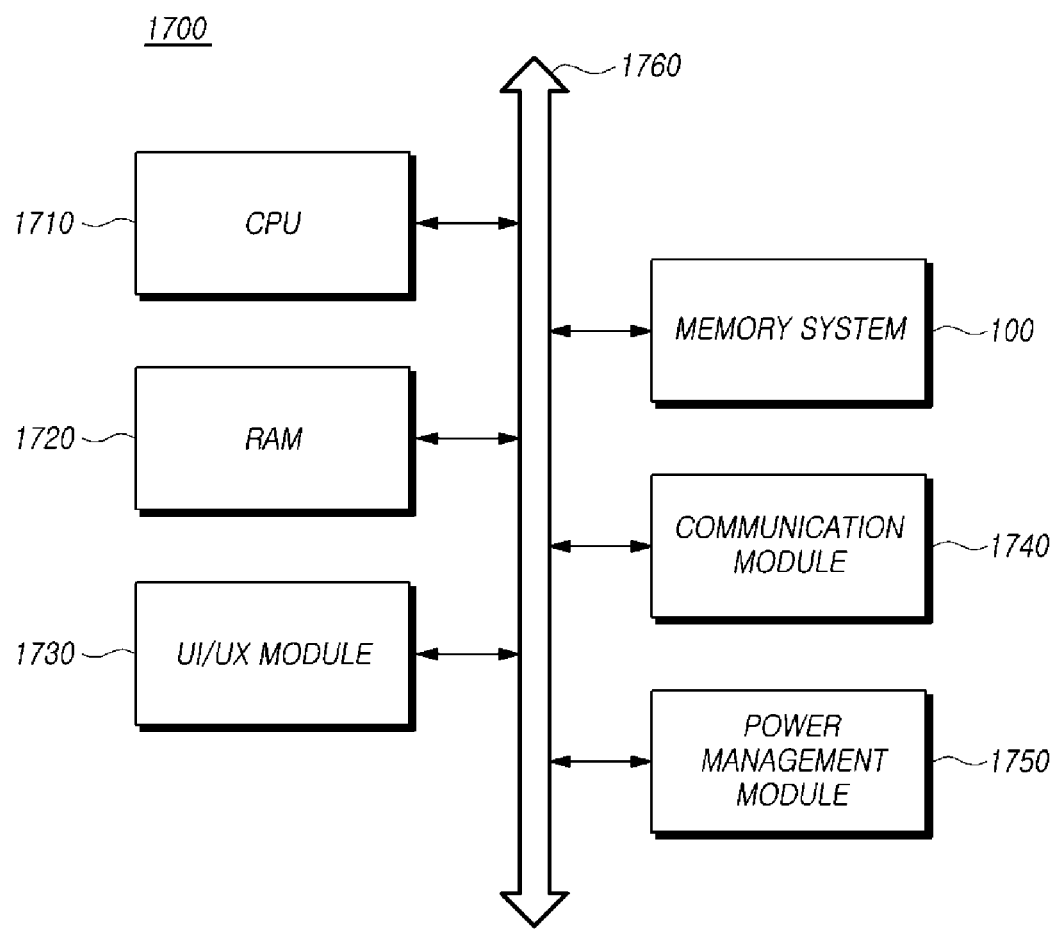
FIG. 17 illustrates the configuration of a computing system based on some embodiments of the disclosed technology.

FIG. 17 is a diagram illustrating the configuration of a computing system 1700 based on an embodiment of the disclosed technology.

Referring to FIG. 17, the computing system 1700 based on an embodiment of the disclosed technology may include: a memory system 100 electrically connected to a system bus 1760; a CPU 1710 configured to control the overall operation of the computing system 1700; a RAM 1720 configured to store data and information related to operations of the computing system 1700; a user interface/user experience (UI/UX) module 1730 configured to provide the user with a user environment; a communication module 1740 configured to communicate with an external device as a wired and/or wireless type; and a power management module 1750 configured to manage power used by the computing system 1700.

The computing system 1700 may be a personal computer (PC) or may include a mobile terminal such as a smartphone, a tablet or various electronic devices.

The computing system 1700 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure and the following claims.

What is claimed is:

1. A memory system comprising:
    a memory device including a plurality of memory blocks; and
    a memory controller configured to control the memory device to write data, which is stored in the memory device, to a first target memory block or a second target memory block among the plurality of memory blocks according to whether a data type of the data is a read-intensive type or a write-intensive type,
    wherein the memory controller is further configured to determine the first target memory block or the second target memory block based on performance characteristics of the plurality of memory blocks, and
    wherein the performance characteristic includes at least one of a read retry count, an error bit rate, and a program cycle count.

2. The memory system of claim 1, wherein the memory controller is further configured to:
    receive, from a host, a read command or a write command corresponding to a logical block address of the data, and
    determine the data type as the read-intensive type or the write-intensive type based on a read command count which is a number of accesses to the data in response to the read command or a write command count which is a number of accesses to the data in response to the write command.

3. The memory system of claim 2, wherein the memory controller determines the data type as the read-intensive type if the read command count is equal to or greater than a first threshold count, and determines the data type as the write-intensive type if the write command count is equal to or greater than a second threshold count.

4. The memory system of claim 2, wherein the memory controller is further configured to monitor the read command count or the write command count during a set target time period.

5. The memory system of claim 1, wherein the memory controller is further configured to:
receive, from a host, type information of the data, and
determine the data type as the read-intensive type or the write-intensive type based on the type information.

6. The memory system of claim 1, wherein, when the data type is the read-intensive type, the memory controller determines, as the first target memory block, a memory block having the read retry count, the error bit rate equal to or less than an average value of the same for the plurality of memory blocks from among the plurality of memory blocks.

7. The memory system of claim 1, wherein, when the data type is the write-intensive type, the memory controller determines, as the second target memory block, a memory block having the program cycle count equal to or less than an average value of the same for the plurality of memory blocks from among the plurality of memory blocks.

8. An operating method of a memory system comprising:
determining whether a data type of data stored in a memory device including a plurality of memory blocks is a read-intensive type or a write-intensive type; and
writing the data to a first target memory block or a second target memory block among the plurality of memory blocks according to the data type of the data,
wherein the writing includes determining the first target memory block or the second target memory block based on performance characteristics of the plurality of memory blocks, and
wherein the performance characteristic includes at least one of a read retry count, an error bit rate, or a program cycle count.

9. The operating method of claim 8, wherein the determining includes:
receiving, from a host, a read command or a write command corresponding to a logical block address of the data; and
determining the data type as the read-intensive type or the write-intensive type based on a read command count which is a number of accesses to the data in response to the read command or a write command count which is a number of accesses to the data in response to the write command.

10. The operating method of claim 9, wherein the data type is determined as the read-intensive type if the read command count is equal to or greater than a first threshold count, and is determined as the write-intensive type if the write command count is equal to or greater than a second threshold count.

11. The operating method of claim 9, further comprising monitoring the read command count or the write command count during a set target time period.

12. The operating method of claim 8, wherein the determining includes:
receiving, from a host, type information of the data; and
determining the data type as the read-intensive type or the write-intensive type based on the type information.

13. The operating method of claim 8, wherein the determining of the first target memory block or the second target memory block includes, when the data type is the read-intensive type, determining, as the first target memory block, a memory block having the read retry count, the error bit rate equal to or less than an average value of the same for the plurality of memory blocks from among the plurality of memory blocks.

14. The operating method of claim 8, wherein the determining of the first target memory block or the second target memory block includes, when the data type is the write-intensive type, determining, as the second target memory block, a memory block having the program cycle count equal to or less than an average value of the same for the plurality of memory blocks from among the plurality of memory blocks.

* * * * *